H. H. GRANT.
AUTOMATIC FEEDER AND FOUNTAIN.
APPLICATION FILED APR. 6, 1910.
966,907.
Patented Aug. 9, 1910.
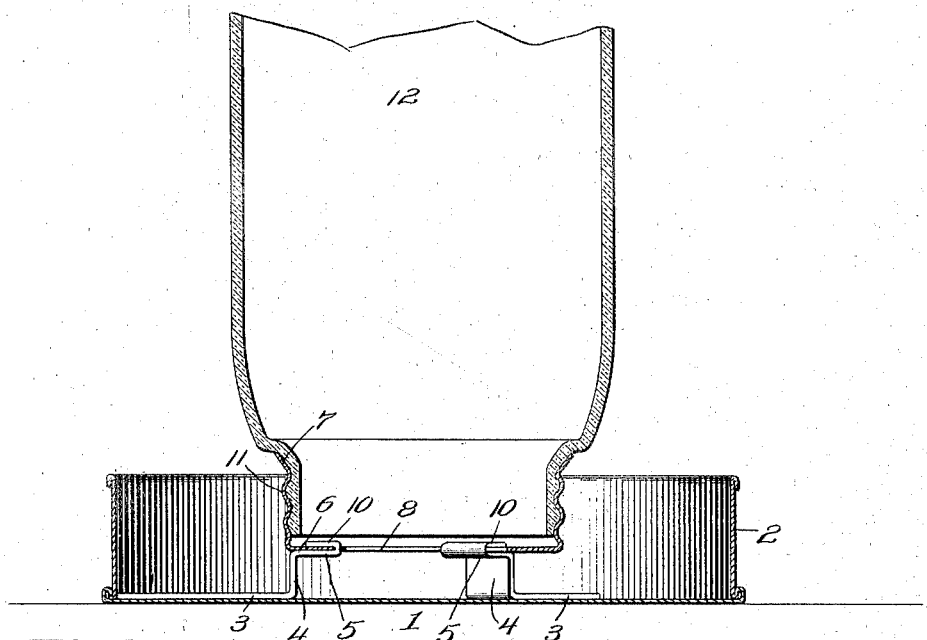
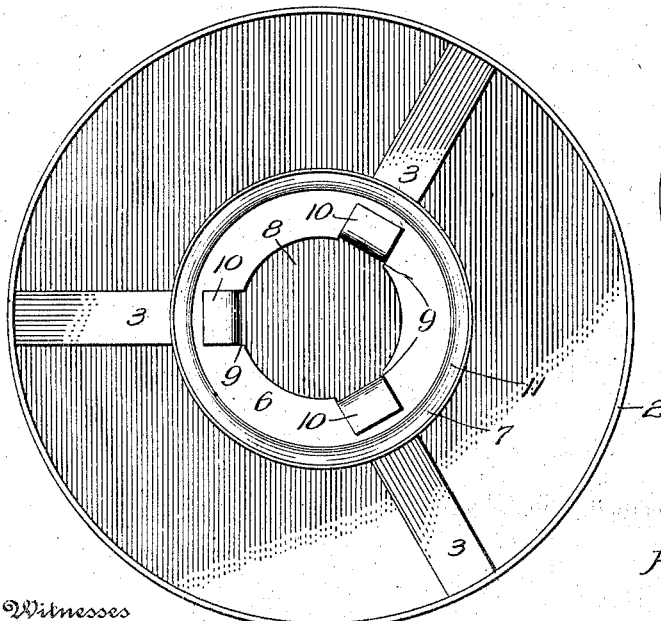
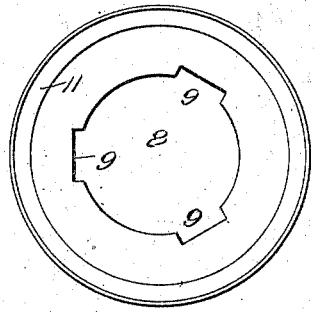
Witnesses
Inventor
Harry H. Grant.
By Victor J. Evans
Attorney

UNITED STATES PATENT OFFICE.

HARRY H. GRANT, OF WARSAW, ILLINOIS.

AUTOMATIC FEEDER AND FOUNTAIN.

966,907. Specification of Letters Patent. Patented Aug. 9, 1910.

Application filed April 6, 1910. Serial No. 553,727.

*To all whom it may concern:*

Be it known that I, HARRY H. GRANT, a citizen of the United States, residing at Warsaw, in the county of Hancock and State of Illinois, have invented new and useful Improvements in Automatic Feeders and Fountains, of which the following is a specification.

This invention relates to automatic feeders and fountains, and has for an object to provide a device of this character designed particularly for use as a watering trough, means being provided whereby the water will be automatically fed from the container to the trough-like-receiving receptacle.

A still further object of my invention resides in the provision of a receptacle adapted to receive the ordinary well known Mason fruit jar.

In the drawing, forming a portion of this specification and in which like numerals of reference indicate similar parts in the several views:—Figure 1 is a detail vertical section through my improved automatic feeder and fountain. Fig. 2 is top plan view thereof with the reservoir removed. Fig. 3 is a detail plan view of the supporting member for the reservoir.

My improved automatic feeder and fountain consists preferably of a shallow pan-like-receiving receptacle, the same in this instance being of cylindrical form and provided with a base portion 1 and an annular wall 2. The said base portion has secured thereto a series of radial leg members 3. These leg members are formed at their inner ends to provide vertical portions 4 and horizontal portions 5. The portions 5 are arranged immediately beneath the horizontal portion 6 of a support 7. This support is formed at its center with an opening 8 which is spaced from the base member for a purpose to be hereinafter described. The support 7 is formed to provide a series of radial notches 9, and as shown, the inner extremities 10 of the supporting legs extend into the notches and are then bent into overlapping engagement with such portion 6. In this manner of associating the legs with the support 7 it will be seen that the latter may be conveniently removed. I further facilitate the engagement of the said support with the respective supporting leg members in the manufacture of the article and entirely obviate the provision of solder or such permanent fastening means.

The support 7 is formed to provide a threaded flange 11 for receiving the threaded neck portion of the jar 12. This jar is of the well known type and serves as a reservoir for the water or food which is to be fed automatically to the pan-like receptacle. The legs 3 are so constructed that their outer extremities abut the annular wall of the said pan-like receptacle so as to center the support 7 and to hold it in the pan-like receptacle so that the space between the support and the wall 2 of the pan-like receptacle will be the same entirely around.

In operation of my improved feeder and fountain, the food or water is placed in the reservoir and the pan-like receptacle is inverted and engaged with the threaded neck of the said reservoir, after which the device is positioned as shown in Fig. 1 of the drawing to permit the water or food to feed automatically to the pan. When the device is used as a fountain the water will be free to flow to the pan until the level of the water is on line with the aperture in the portion 6 of the support 7.

The device is extremely desirable for use on stock farms where young chickens, ducks or like fowls must be given a constant fresh supply of water.

I claim:

As a new article of manufacture, a combined feeder and fountain comprising a pan-like receptacle provided on its bottom with a plurality of legs having horizontal portions spaced from the bottom of the receptacle at a point near the center thereof, an apertured support having the walls of its aperture formed to provide a plurality of notches, the said horizontal portions of the legs having their extremities extended into the notches and bent onto the said apertured portion of the support, and a reservoir removably engaged with the said support.

In testimony whereof I affix my signature in presence of two witnesses.

HARRY H. GRANT.

Witnesses:
EDW. GRIMPE,
C. E. BRINKMAN.